Figure 1:
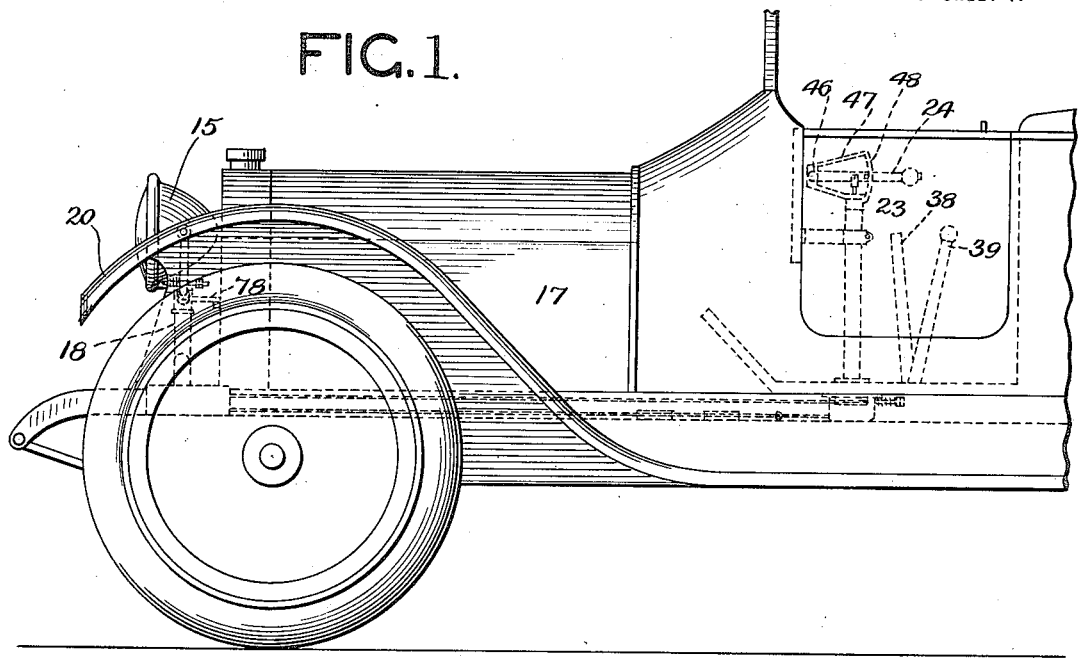

R. WILCOX.
DIRIGIBLE LAMP.
APPLICATION FILED MAR. 18, 1915.

1,169,898.

Patented Feb. 1, 1916.
5 SHEETS—SHEET 1.

Witness:
Jos. C. Devick.

Inventor:
Roscoe Wilcox.
By E. J. Andrews
atty

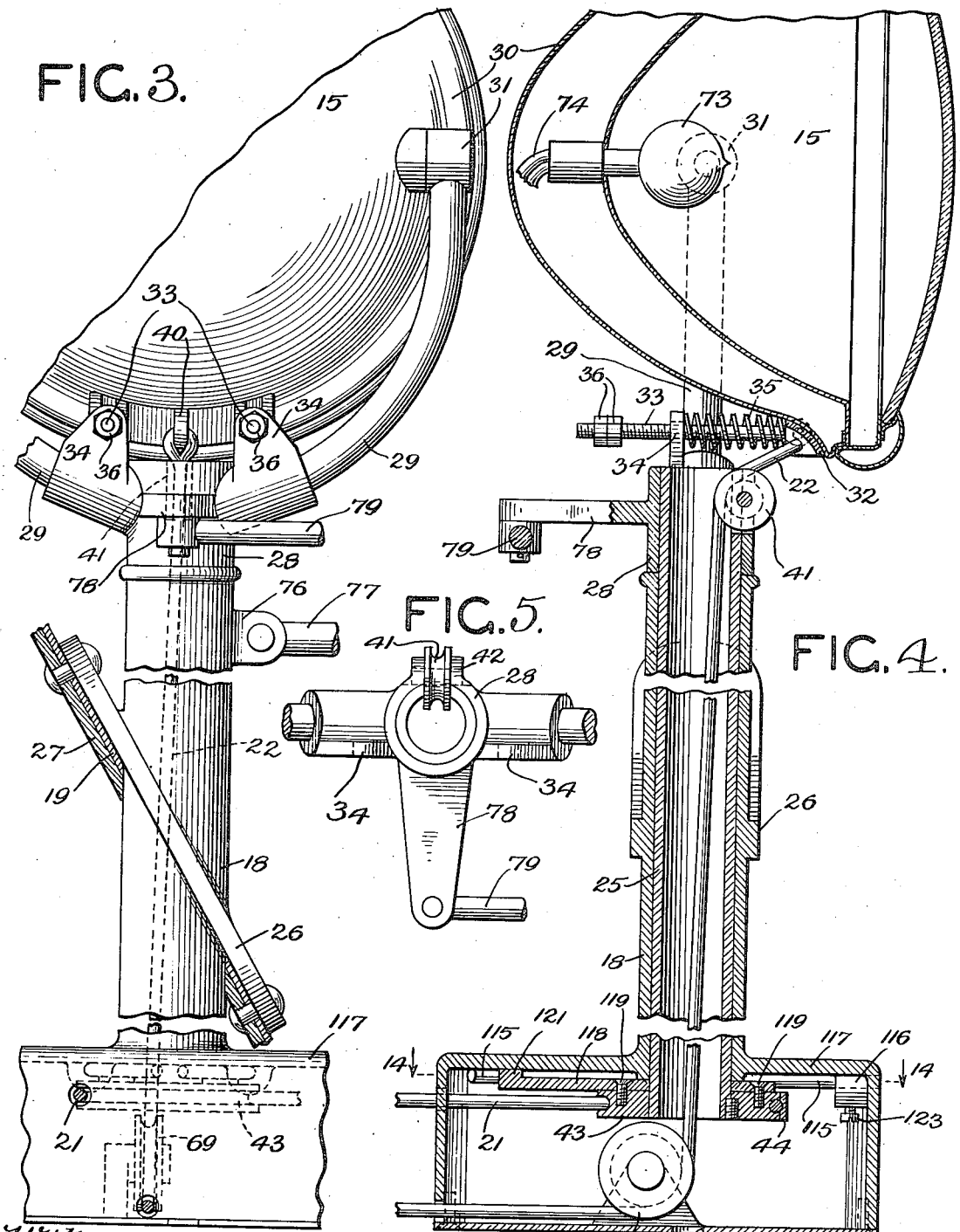

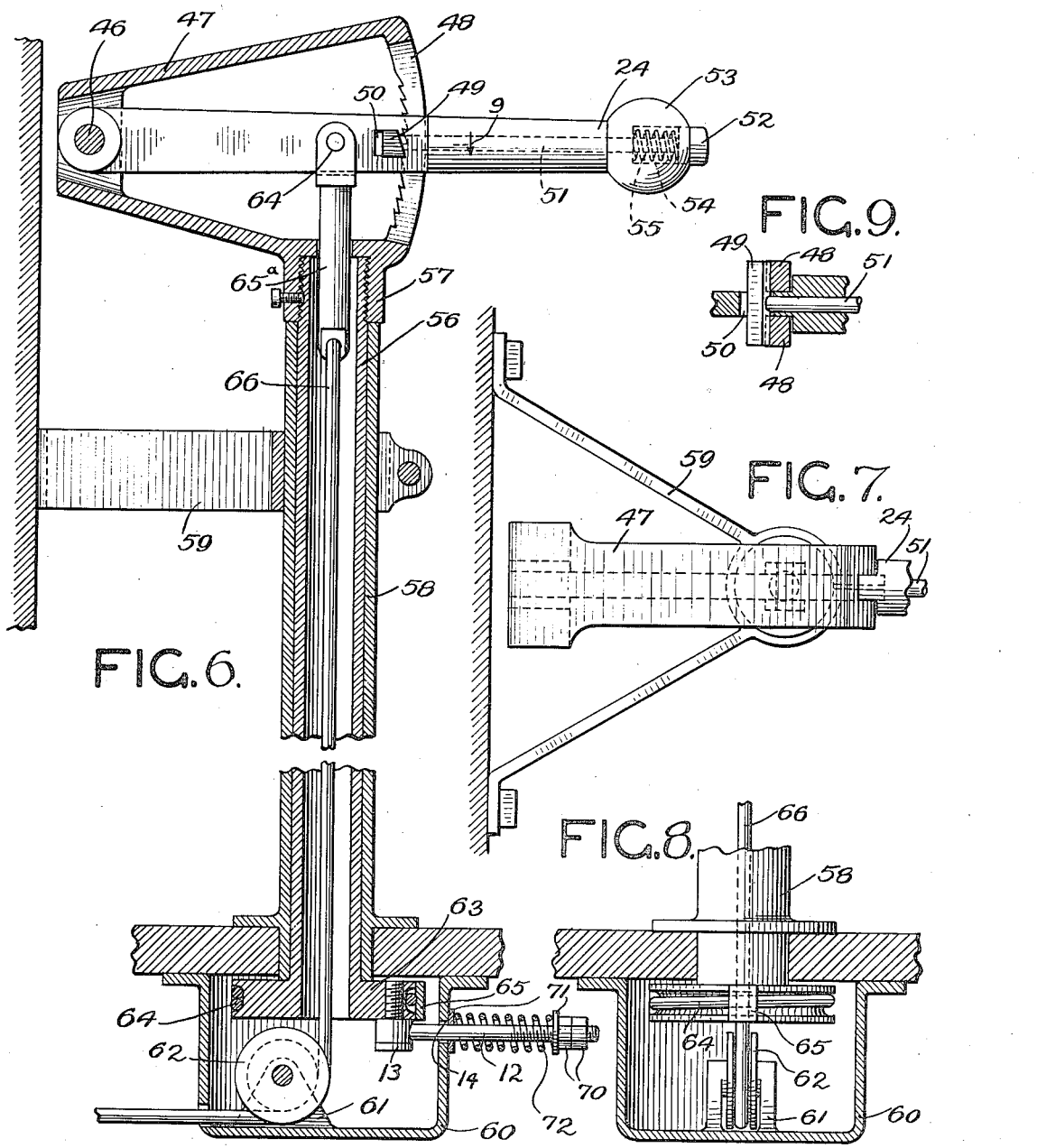

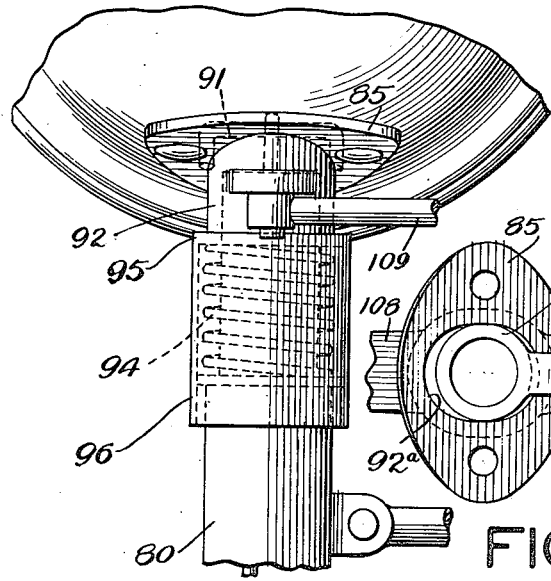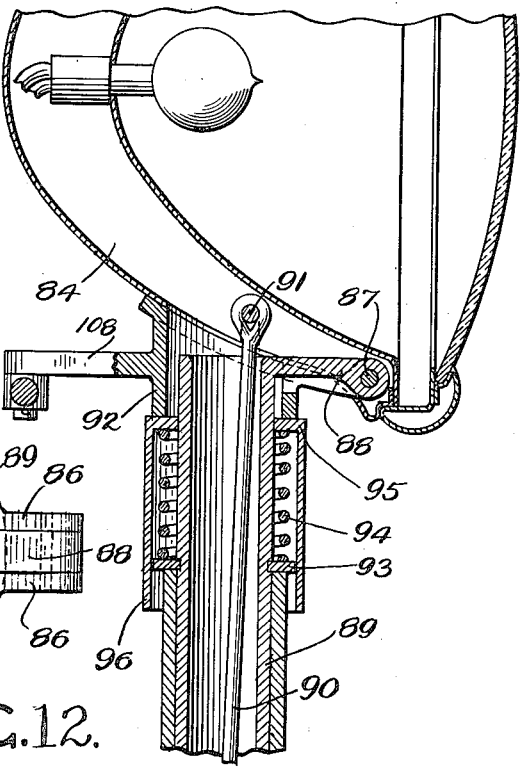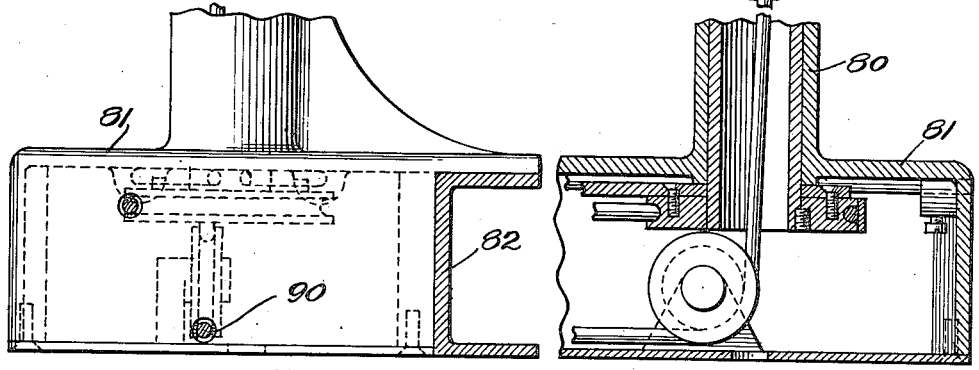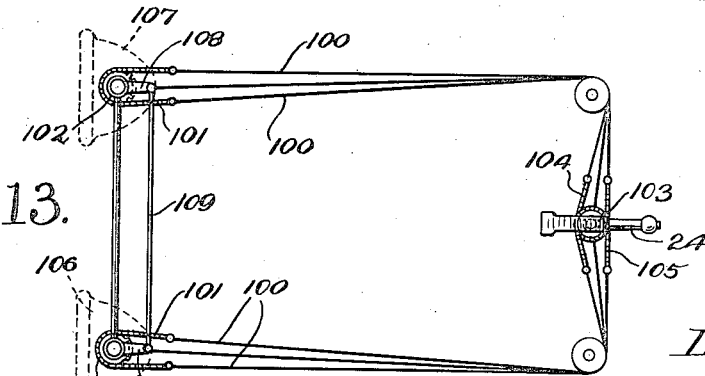

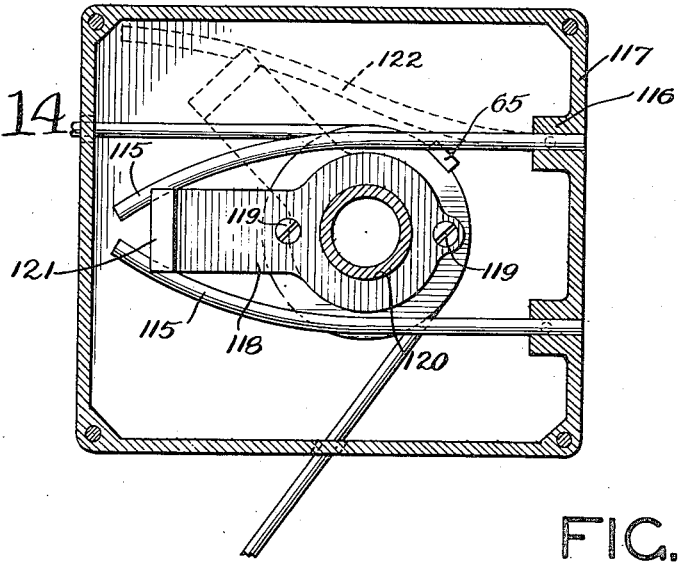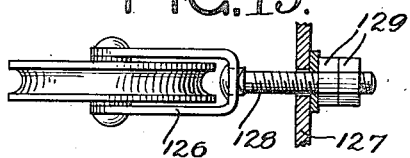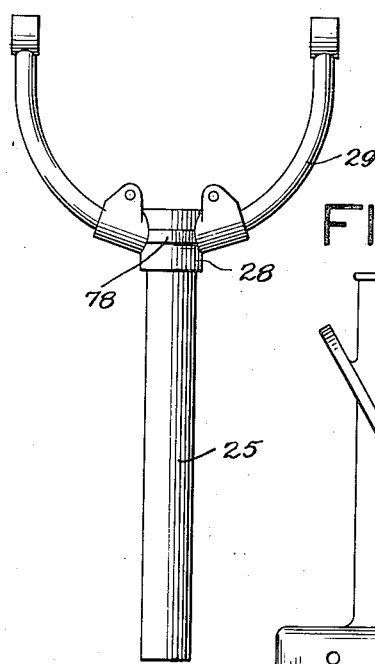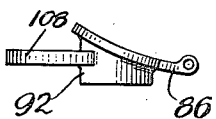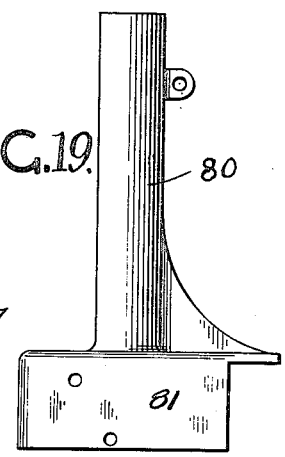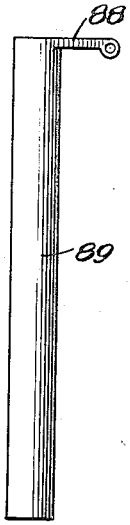

UNITED STATES PATENT OFFICE.

ROSCOE WILCOX, OF LOMBARD, ILLINOIS.

DIRIGIBLE LAMP.

1,169,898. Specification of Letters Patent. Patented Feb. 1, 1916.

Application filed March 18, 1915. Serial No. 15,221.

*To all whom it may concern:*

Be it known that I, ROSCOE WILCOX, a citizen of the United States, residing at Lombard, in the county of Du Page and State of Illinois, have invented certain new and useful Improvements in Dirigible Lamps, of which the following is a specification.

This invention relates to searchlights, headlights, or any type of lamp the light from which is thrown outwardly, by any optical means, in one general direction, and where it is desired to vary, from a distance, the direction in which the light passes from the lamp; thus producing what may be called a dirigible light.

The particular application which I make of the invention in this instance is to headlights to be used on vehicles. And one of the objects of my invention is to produce headlights so constructed, and so mounted on the vehicle, that, by the use of suitable operating mechanism, the headlights may be rotated in various directions so as to direct the light therefrom wherever the operator may desire; that is to produce what may be called dirigible headlights.

In the operation of an automobile, or other motor driven vehicle, in the night time, the glare of the headlights, when they are directed horizontally forward, is frequently objectionable, and in many cities is prohibited by ordinance unless the lights are reduced in brightness, or otherwise varied so as to remove the objectionable feature. In carrying out my invention, I construct and arrange the headlights so that, by the use of suitable mechanism, the lights may be directed horizontally when desired, or may be tilted downwardly in a vertical plane so as to remove the objectionable feature of the bright horizontal light. When so tilted the portion of the light which is projected horizontally is merely a portion of the fringe of the light, and hence is much dimmer than the central portion of the beam; and the bright portion of the beam striking the ground before passing a very material distance from the vehicle is unobjectionable. This tilted arrangement of the lights, however, is better than to dim the lights, for the reason that the operator then has bright light cast on the ground in front of his machine so that objectionable features in the roadway are easily discernible. In fact, merely for this purpose, it is desirable to have the light tiltable, so that in traveling over rough or dangerous roads, the operator may, by tilting the lights downwardly, have a clear view of the track immediately ahead, even though the ground ahead may be slanting downwardly while his machine is still in a horizontal position. It is also frequently desirable to be able to rotate the lights in a horizontal plane. When approaching a corner, by rotating the lights somewhat in the direction toward which the vehicle is to be turned, the operator may see the road around the corner more clearly than if the light is always in a line with the vehicle itself. Also it is frequently desirable to throw the light a material distance horizontally at an angle with the machine in order to see signs or buildings or other objects toward one side of the road or at one side of the vehicle.

In carrying out my invention one purpose is to provide for such horizontal rotation of the headlight by suitably mounting the same on the machine and by providing suitable mechanism.

When the lights are turned horizontally, at an angle to the vehicle, it is sometimes desirable also to tilt the lights vertically, either upwardly or downwardly in order to see objects on the ground or elevated objects. So that a part of my invention consists in arranging for simultaneous horizontal rotation and vertical rotation of the lights, by mounting the headlights for universal rotation, to a limited extent, and by providing suitable operating mechanism for producing such rotation.

Another object of my invention is to operatively connect the headlights in such a manner that the two lights will be operated synchronously, when rotated horizontally or vertically, or when rotated simultaneously in both directions.

Another object of my invention is to produce simple, efficient and dependable operating mechanism for rotating the headlights in the manner hereinabove described, and mechanism which is inexpensive, easily installed, and easily repaired in case of injury.

A further object of my invention is to produce means whereby the headlights are always held firmly in place in the rotated or tilted positions, and to hold the headlights in the tilted positions permanently after the operator has released the operating mechanism.

A further object of my invention is to produce mechanism which automatically tends, at all times, to rotate the headlights to certain positions in the horizontal and the vertical planes, for reasons which will be hereinafter fully explained.

Other objects of the invention will be apparent to those familiar with the art upon a consideration of the accompanying drawings and the following description thereof.

Figure 2:
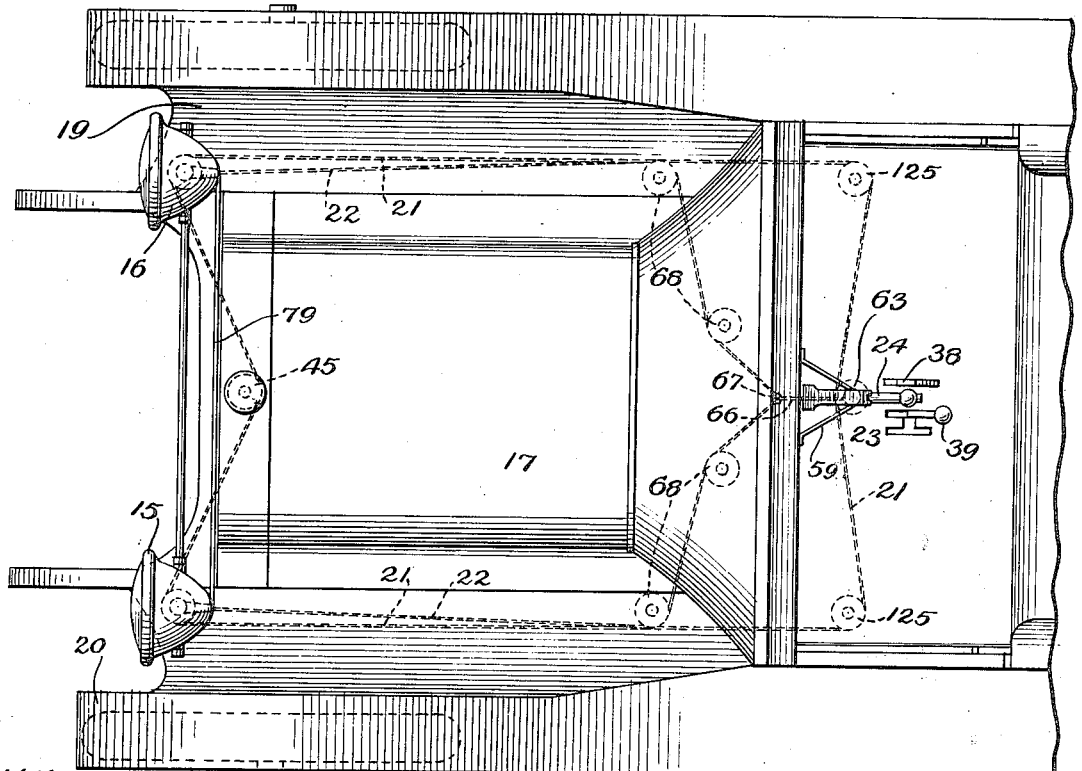

In the accompanying drawings Figure 1 is a side elevation of the vehicle upon which is mounted headlights and operating mechanism which embody the features of my invention. Fig. 2 is a plan view of the same. Fig. 3 is an elevation of a portion of a headlight and the supporting standard of the same, showing a portion of the operating means. Fig. 4 is a central sectional view otherwise similar to Fig. 3, but at right angles thereto. Fig. 5 is a plan view of the fork supporting the lamp. Fig. 6 is a central sectional view of the operating mechanism of my invention. Fig. 7 is a plan view of the operating mechanism. Fig. 8 is a central section of a portion of the mechanism shown in Fig. 6 but at right angles thereto. Fig. 9 is a detail sectional view of a portion of the mechanism shown in Fig. 6. Fig. 10 is an elevation of a modified form of standard and support for the lamp. Fig. 11 is a central sectional view of the same at right angles to Fig. 10. Fig. 12 is a plan view of the lamp support shown in Fig. 10. Fig. 13 is a plan view of a modified form of operating mechanism for the lamp, and the connecting means. Fig. 14 is a sectional view along the line 14—14 of Fig. 4. Fig. 15 represents a means for adjusting the tension of the operating cable of the system. Fig. 16 is a detached view of the lamp support indicated in Fig. 3. Fig. 17 is a detached view of the lamp standard or post of Fig. 3. Figs. 18, 19, and 20 are detached views of portions of the lamp support and standard of Fig. 10.

In the drawings the headlights 15 and 16 are shown mounted on the forward end of the automobile 17 in the usual location, and, in this instance, the standard 18 of each of the headlights is shown mounted upon the fender 19, which supports the mud-guards 20, of the forward wheels of the automobile. The headlights are mounted for rotation in a horizontal plane, and also in a vertical plane, in a manner hereinafter described. And flexible cables 21 and 22, operatively connected to each of the headlights for producing horizontal and vertical rotation thereof, pass rearwardly to some suitable location on the vehicle, for operative connection with the mechanism for operating the headlights. In this instance I have shown the operating mechanism 23 located immediately in front of the seat of the driver, or the operator, of the vehicle. The mechanism in this instance comprises a universally mounted lever 24, with which the cables 21 and 22 are properly connected, and which is more fully described hereinafter.

The supporting post 18 of each headlight is fixed, by means of a flange 26, to the fender 19 and the fender support 27, the post passing through the fender and its support. Rotatably mounted in the post 18 is a tube 25. Fixed to the upper end of the tube 25 is a collar 28, which rests upon the upper end of the post 18, and which supports the arms 29 which extend, in a common manner, upwardly to opposite sides of the lamp casing 30. The casing however, is pivoted, by means of the bearings 31, to the upper ends of the arms 29. By these means the headlights are pivoted for vertical rotation, or tilting. And in order to suitably tilt the lamps in a vertical plane, the cable 22 is connected to the lower forward portion of each lamp casing by a lug 40, and passes over a pulley 41 pivoted, at the upper end of the tube 25, to a lug 42, fixed to the collar 28. The cable extends then downwardly through the tube 25 and then rearwardly, as indicated in Fig. 2, to the operating mechanism 23; and by means of this mechanism the cables may be pulled so as to force the lower edges of the lamps rearwardly, toward the post 18, thus tilting the headlights downwardly.

Pivoted to the casing of the lamp at the point 32, adjacent to the point of connection of the cable 22 to the casing, are pins 33, each of which passes through an aperture in a lug 34 fixed to the rotatable tube 25. On these pins are mounted, between the lugs 34 and the lamp casing, compression springs 35 which tend at all times to tilt the front of the lamp upward; while lock nuts 36, threaded onto the pins 33, act as stops to limit the upward movement of the forward portion of the lamp. From this description the tilting operation of the lamps will be apparent: When, by means of the operating mechanism 23, the operator increases sufficiently the tension of the cables 22 the forward portion of the lamps will be synchronously tilted downwardly to the extent desired, the compression springs however, limiting the amount of downward tilting possible. And, when the cable is released or slackened, the lamps will be tilted upwardly again, by means of the springs 35, to their normal or horizontal positions, or beyond if desired, the limit of upward tilting being determined by the positions of the lock nuts 36 on the pins 33. If it is desired permanently to set the lamps tilted to any particular position in the vertical plane, the lock nuts may be screwed inwardly on the pins 33, so as to hold the lamps permanently, without reference to the cables 22, in the position desired; provided only that the cables 22 are allowed to be sufficiently slack.

Each headlight is mounted for rotation in a horizontal plane. The tube 25, on the upper end of which are mounted the arms 29, and which is rotatably mounted in the post 18, projects downwardly through the post and has fixed to its lower end the pulley 43. Passing partly around this pulley is a portion of the operating cable 21, the cable being fixed to the pulley by means of a clamp 44 so that relative movement thereof is prevented. By these means the lamps may be rotated in a horizontal plane. When one of the cables 21 is pulled by the operator, the pulley 43 to which the cable is connected, together with the tube 25, will be rotated and they will thus rotate the arms 29 and hence the lamp. As the cable 21 passes from one pulley 43 over a pulley 45 Fig. 2, and then to and around the other pulley 43 and back to the operating mechanism, it is evident that a pull of the cable on one side of the automobile will not only rotate the lamp on that side but will simultaneously rotate the lamp on the other side. So that, when the right-hand cable 21 is pulled, both lamps will rotate synchronously toward the right; and when the left-hand cable is pulled both lamps will rotate synchronously toward the left.

In connection with the horizontal rotating means, I have provided means for restoring the lamps to their normal forward positions, and for holding the lamps firmly in any position. For this purpose I provide springs 115 Fig. 14. One end of each of these springs is fixed in a boss 116 projecting from the wall of a casing 117 which incloses the pulleys 43 and 69 and other mechanism adjacent the lower end of the tube 25. The springs are held in place by the set screws 123, Fig. 4. An arm 118, is fixed, in any suitable manner, to the pulley 43 and tube 25. In this instance I fasten this arm onto the pulley 43 by means of screws 119, the lower end of the tube 25 projecting through the opening 120 in the arm 118. The outer end 121 of this arm extends between the outer or free ends of the springs 115, and normally the arrangement is such that these two springs press against the end 121 of the arm 118, holding it firmly in a rearwardly extending position, and thus holding the lamp firmly in the normal forward position.

When the lamp is rotated horizontally the arm 118 is rotated in one direction or the other displacing one of the springs 115 so that the displaced spring tends with more constantly increasing force to restore the lamp to normal position, or to hold it firmly in the new position. The other spring, striking against the hub of the arm 118, is prevented from following the displaced spring, and hence the displaced spring is more effective in returning the lamp to normal position, and the lamp is brought to rest without vibrations, as neither spring is able to follow up the displacement of the other. By this means also the lamp is held in normal position more firmly than if no stop were provided; and I am enabled to have each spring under material unopposed tension acting on the lamp at the beginning of displacement. When the arm 118 is rotated to the position indicated by the dotted lines in Fig. 14 the displaced spring takes the position indicated by the dotted lines 122, and the outer end of the spring, coming in contact with the casing 117, prevents further rotation of the lamp. If the cable on the side of the vehicle toward which the lamps are turned is allowed to slacken the displaced springs 115 will restore the lamps to their normal positions, and if desired the lamps may both be rotated still farther by the operator pulling upon the cable on the other side of the vehicle. In any position the vibration of each lamp is prevented by the two springs associated with the lamp, or by the displaced spring pressing firmly against the arm 121, which, when rotated from normal position, is held against the spring by means of the cable 21. And whenever the operating lever is released by the operator the lamps will be automatically restored to their normal positions.

The mechanism for operating the lamps, or what I have termed the operating mechanism, consists of the following: Mounted on the vehicle, adjacent the emergency brake lever 38 and the change-speed lever 39, in any suitable position, is the lever 24 pivoted by the pivot 46 to a frame 47 which is mounted in a manner hereinafter described. Forming a part of the frame 47 are the two ratchet racks 48 between which the arm 24 moves as the arm is reciprocated in a vertical plane. Slidably mounted on the arm 24 is a pawl 49 which passes through the aperture 50 in the arm 24 and is of length sufficient to allow it to coact with the teeth of both of the racks 48. Fixed to the pawl 49 is a pin 51 slidably mounted in the arm 24. The pin has a head 52 on the outer end thereof projecting from the arm 24. Within the ball 53 of the arm 24 is a chamber 54 through which the pin 51 passes; and a compression spring 55 is mounted on the pin 51 between the head 52 and the inner end of the chamber 54. This spring tends at all times to push the pin 51 outwardly and thus to hold the pawl 49 into coaction with the teeth of the racks 48. The outer end of the lever 24 may at all times be pulled upwardly, as the shape of the pawl and of the teeth cause the pawl 49 to be pushed inwardly out of the way of the teeth when the lever 24 is raised. Downward motion of the lever is possible however only when the head 52 is pushed inwardly so as to release the pawl 49 from the teeth.

The frame 47 is fixed on a tube 56 by means of the coupling 57 projecting from the frame, and which is threaded on the upper end of the tube. The tube 56 is rotatably mounted in the supporting tube 58 which is supported at its upper end by means of the bracket 59 fixed to the instrument board or to some other portion of the vehicle. The lower end of the supporting tube 58 is fixed to the floor of the vehicle. The tube passes downwardly and projects beyond the floor into a casing 60.

It will thus be seen that the lever 24 is mounted for universal rotation. Inasmuch as one end of the lever is pivoted to the frame 47, on a horizontal pivot 46, the lever may be reciprocated in a vertical plane; and, inasmuch as the frame is mounted upon the rotatable tube 56, the entire lever and frame may be rotated freely in a horizontal plane. So that the controlling lever, like the headlights of the vehicle, may be rotated either horizontally or vertically.

The headlights may be tilted in a vertical plane by the use of the following described means: Pivoted to the lever 24, by the pivot 64, is a pin 65ª which projects downwardly into the tube 56; and fixed to this pin 65ª is one end of a cable 36. Mounted in the casing 60, by means of a bracket 61, is a pulley 62. The cable 66 passes downwardly through the tube 56, under the pulley 62, and then forwardly to the point 67 where it connects with the cables 22 which, from this point, pass to opposite sides of the vehicle over the pulleys 68 and forwardly, along each side of the vehicle, to the pulleys 69 in the casing 117, and thence upwardly over the pulleys 41, to the point of connection with the headlights, as hereinabove described.

By raising lever 24 cable 66, and thus cables 22, will be tightened, and the tension thereon will cause the headlights to be tilted downwardly in a manner hereinabove described. The pawl 49 coacting with the teeth of the racks 48, will hold the lever 24 in its elevated position; and hence will hold the headlights in their downwardly tilted positions against the restoring force of the springs 35, and, by having the springs 35 sufficiently strong, all vibrating tendency of the headlights in a vertical plane will be prevented whatever the tilted position of the headlights may be.

When the lever 24 is in its raised position, by pressing upon the head 52 of the pin 51 the pawl 49 will be released, the lever will move downwardly by virtue of its weight and the weight of the attached members, and the springs 35 will tilt the headlights upwardly to the position desired; when, upon release of the head 52, the headlights will be maintained in the new positions. It will thus be seen that the operator at all times has positive control over the angle with the horizontal plane at which the lights are projected from the lamps.

The headlights may be rotated in a horizontal plane by the use of the following described means: Fixed to the lower end of the rotatably mounted tube 56 is a pulley 63. Passing around this pulley 63 is a portion 64 of the cable 21, and this portion of the cable is fixed to the pulley 63 by means of the clamp 65; so that slipping of the cable on the pulley is prevented. Hence as the lever 24 is rotated in a horizontal plane the pulley 63 will be rotated, and the cable 21 on one side will be pulled rearwardly and will be allowed to move forwardly on the other side. This, in the manner hereinabove described, will cause the pulley 43, and hence the headlights, to be also rotated in the horizontal plane. When the free end of the lever 24 is rotated toward the right the headlights will be rotated toward the left; and then when the end of the lever is rotated toward the left the headlights will be returned toward the right to their normal forward positions, and may be then rotated still farther toward the right.

In addition to the means hereinabove described for restoring the headlights to normal forward position, I provide means for restoring arm 24 rearwardly to the normal position. These means comprise a pin 12 which is pivoted by means of the pivot 13 to the wheel 63; this pin passes outwardly from the casing through an enlarged opening 14 therein, and, at its outer end, is provided with the adjustable lock nuts 70. On this pin, between the lock nuts and the casing, are the washers 71, and between these washers is a compression spring 72. This compression spring tends at all times to force the pin 12 outwardly and to hold the portion of the pulley 63 to which the pin is pivoted toward the rear of the vehicle. So that when the lever is rotated from the rearwardly extending position the pivot 11 is rotated similarly and the compression spring 72 tends to pull the pivot 13, and thus the lever, back to the normal rearwardly extending position. It will thus be seen that the spring 72 and the springs 115 at all times tend to coact, and tend to restore the headlights and the operating mechanism to the normal positions; and the spring 72 holds the operating mechanism firmly in its normal position, so that horizontal vibrations thereof are substantially prevented, irrespective of any slight slack which may exist in the cables. I also employ other means for preventing vibrations of the lamps, and to insure synchronism thereof when they are rotated in a horizontal plane: Fixed to each post 18 is a lug 76; and a bar or tube 77, connects, in a common manner, these lugs, producing increased stability of the posts. And fixed to each collar 28 is an arm 78; and a stiff rod 79 is pivotally connected at its respective ends to these arms. This rod 79 prevents any relative rotation of the lamps and thus reduces any vibrating tendency and insures horizontal synchronism.

In order to adjust the tension of the various cables used in the system I provide means for adjusting the position of the pulleys 68 and 125 over which the respective cables run. Each pulley is pivoted in a U strap 126, and the strap is connected to the frame 127, of the machine by means of a screw bolt 128, upon which are threaded the adjustable lock nuts 129. The position of the nuts on the bolts determines the tension on the cables.

In this embodiment of my invention I have shown electric lamps 73 as the source of light. The lamps are operated by means of flexible electric cables 74. These cables may pass downwardly from the point of connection with the lamps, through the supporting tubes 25, and out of the casings 117 through apertures 75. But, to avoid confusion, the cables are not shown in the tubes and casings. It is to be understood, however, that my invention is not limited to electric lamps or to any particular kind of lamps used in the headlights; as it is applicable to headlights using any ordinary means as sources of light.

The particular application of my invention hereinabove described is to an automobile with the headlights mounted on the fender of the machine. It frequently happens that the headlights are mounted in some other manner, for instance, directly on the framework of the machine; and I have in the accompanying drawings, Figs. 10 and 11, illustrated the headlights so mounted. In this instance I show the supporting standard or post 80 fixed to the casing 81 inclosing the mechanism at the lower end of the post, the casing itself being fixed directly to the frame 82 as indicated. In connection with this modification of the headlight supports I illustrate the modified means for rotating and tilting the headlights. Each headlight casing 84 has fixed thereto a plate 85 to which are fixed arms 86, the outer ends of which are pivoted, at the point 87, to an arm 88 which projects forwardly from the tube 89 which is rotatably mounted in the supporting tube or post 80. And the operating cable 90 passes upwardly from the operating mechanism, through the tube 89 and is fixed at the point 91 to the casing of the lamp. It is thus apparent that when the operator elevates the free end of the lever 24 the tension on the cable 90, which is operatively connected to the pin 65 of the operating mechanism, will cause the headlights to be tilted upwardly.

In order to prevent horizontal vibrations of the lamps, I provide the following described means: A collar 92 is fixed to each plate 85, and thus to the casing of the headlight, and passes over the upper end of the tube 89. The bore 92$^a$ of the collar 92 is made oblong as indicated in Fig. 12, so that the collar, although pivoted at the point 87, may pass freely downwardly over the tube 89; but the width of the bore is substantially equal to the external diameter of the tube; so that the bore is snugly in contact with the tube at all times and relative horizontal movement of the collar and the tube is prevented. The arm 88 playing snugly between the arms 86 also tends to prevent horizontal vibrations of the headlights.

To tilt the headlights downwardly, and to hold them firmly in any position, I provide the following described means; Resting on the upper end of the tube 18 is a washer 93 encircling the tube 89, and above this, also encircling the tube 89, is a compression spring 94. Upon the upper end of this spring is a washer 95 upon which rests the collar 92. It is apparent that this compression spring will at all times tend to force upwardly the collar 92 and thus to tilt the headlights downwardly; and, inasmuch as this spring always opposes the tension on the cable 90, it will hold the headlight firmly at all times in any position. Fixed to the washer 95 is a collar 96, which incloses the spring 94 and passes freely over the washer 93, so that dust and moisture are excluded at all times from the inclosed mechanism.

It will thus be seen that the headlights may at all times be rotated freely in a horizontal plane and may also be tilted freely in a vertical plane; that the compression spring 94 acting against the cable 90 will hold the headlight firmly in any tilted position; and that the collar 90 passing over the upper end of the tube 88 and fitting snugly against its sides, together with the arrangement of the arms 86 and 88, will prevent all horizontal vibrations of the headlight whatever its position may be. The means for rotating the headlights in a horizontal plane in this instance are similar to the means shown in reference to the preferred form of headlights and supports. It is to be understood however that any suitable means may be used.

In Fig. 13 I show a modified operating system for controlling the horizontal positions of the headlights. Instead of clamping the cables to the headlight pulleys, to prevent relative movement thereof, I attach to the cables 100 short pieces 101 of chain belt. These belts coact with sprocket wheels 102, fixed to the lower ends of the rotatably mounted supporting tubes of the headlights, said tubes corresponding to tubes 25 of my preferred form of apparatus. Thus the sprocket wheels in this instance replace the pulleys 43 of my preferred mechanism. In this modification I also replace pulley 63, of my preferred mechanism by a sprocket wheel 103, and connect the cables 100 to chain belts 104 and 105 which coact with the sprocket wheel 103. Also as a modification of the cable system I have, in the form illustrated by Fig. 13, instead of passing the cable from one headlight to the other, passed each cable from the headlight directly back to the operating mechanism 23. When the lever 24 is moved toward the right, the chain belt 105 is carried toward the right and the chain belt 104 toward the left. This causes the outer left-hand cable 100 to be carried rearwardly and the inner cable to be carried forwardly, so that the sprocket wheel 102 is rotated, and the headlight 106 is caused to rotate toward the left. At the same time the inner cable on the right hand side of the machine is forced rearwardly and the outer cable is forced forwardly, so that the headlight 107 is also rotated to the left. And the reverse process takes place when the operating lever 24 is forced toward the left. Suitable springs, for example such as hereinabove described, are used for restoring the headlights and the lever 24 to the normal positions. In case of this modification, to assist in obtaining synchronous operation of the headlights, I fix to the collar 92 of each headlight an arm 108 extending rearwardly. At the outer end of each of these arms I pivot the ends of a rod 109. By these means the two headlights are free to rotate provided always that they rotate synchronously; and all tendency of the headlights to vibrate or to rotate irregularly will be prevented.

Although I have described with considerable particularity the details of the mechanism which I prefer to use in carrying out my invention yet it is to be understood that various other modifications thereof may be made by those skilled in the art without departing from the scope of my invention as disclosed by the following claims.

I claim as my invention—

1. In an automobile with dirigible headlights, an operating mechanism comprising a vertical tube mounted for rotation; an operating lever mounted for vertical rotation on one end of said tube; headlight operating means passing from the other end of said tube to said headlights; headlight operating means passing from said lever to said headlights; and resilient means tending to hold said tube in normal position.

2. The combination of an automobile, a pair of headlights, an operating mechanism, a relatively long tube passing away from said mechanism, a tube supporting each headlight, means passing through each of said tubes operatively connected with said mechanism for producing vertical rotation of each of said headlights, and means connecting all of said tubes for producing horizontal rotation of said headlights.

3. In an automobile with dirigible headlights, an operating mechanism for said headlights comprising an operating lever mounted for vertical rotation; pawl and ratchet means for preventing downward movement of said lever; means mounted on the free end of said lever for releasing said pawl and ratchet means; headlight operating means passing downward from said lever, and resilient means tending to pull said operating means away from said lever.

4. In an automobile, a rotatable headlight and resilient means tending to hold said headlight in normal position, said means comprising an arm non-rotatable with reference to said headlight, a spring normally opposing the movement of said arm in one direction, and means preventing movement of said spring beyond its normal position in the opposite direction.

5. In an automobile a rotatable headlight, resilient means opposing rotation of said headlight out of its normal position in one direction, other resilient means opposing rotation of said headlight out of its normal position in the opposite direction, and means preventing movement of each of said resilient means out of its normal position in its non-opposing direction.

6. In an automobile, a lever pivoted at one end for vertical reciprocation; a pawl slidably mounted on said lever; a framework; a ratchet rack fixed vertically to said framework adjacent said pawl; resilient means tending to hold said pawl into coaction with said rack; means fixed to the free end of said lever for releasing said pawl; said pawl normally preventing downward movement of said lever; guide rollers fixed to said automobile; a headlight tiltably mounted on said automobile; a cable operatively connected to said lever passing downward therefrom over said guide rollers and connected to said headlight; and resilient means tending to tilt said headlight and to hold said cable taut.

7. The combination of an automobile, a tube mounted for rotation on said automobile, a lamp tiltably mounted on said tube, a tube rotatably mounted on said automobile, an operating mechanism fixed to said latter tube, means passing through each of said tubes and operatively connected to said lamp and to said mechanism for tilting said lamp, and means connecting said tubes for producing horizontal rotation of said lamp.

8. The combination of an automobile, a pair of tubes vertically and rotatably mounted on said automobile, a lamp tiltably mounted on one of said tubes, an operating mechanism fixed to the other tube, means passing from one of said tubes to the other and eccentrically connected to each of said tubes for synchronously operating the tubes, and lamp tilting means passing through each of said tubes and being operatively connected to said lamp and to said mechanism.

In testimony whereof, I hereunto set my hand.

ROSCOE WILCOX.